Feb. 9, 1937.  H. C. EASTER  2,070,395
COMBINATION STRAINER AND VALVE
Filed April 5, 1934
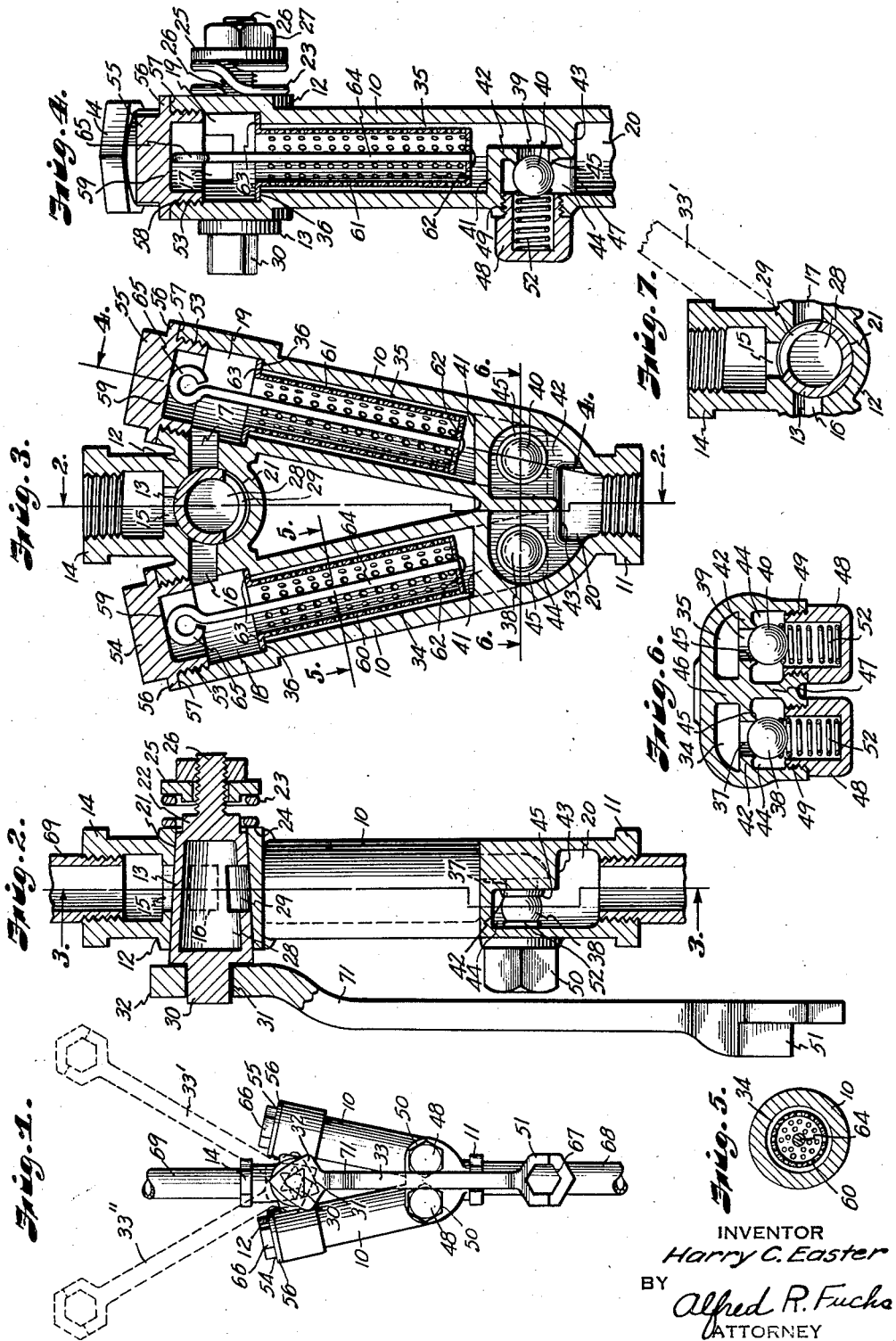
INVENTOR
*Harry C. Easter*
BY *Alfred R. Fuchs*
ATTORNEY Patented Feb. 9, 1937

2,070,395

UNITED STATES PATENT OFFICE 2,070,395

COMBINATION STRAINER AND VALVE

Harry C. Easter, Kansas City, Mo.

Application April 5, 1934, Serial No. 719,172

4 Claims. (Cl. 210—168)

My invention relates to combination strainers and valves, and more particularly to a device of the above mentioned character that is provided with a simple valve mechanism, and which is so constructed and arranged that either of the strainers provided therein can be readily removed while the device is in operation, the flow of liquid at such time being through the strainer that is not removed, and such flow of liquid taking place without any danger or possibility of liquid entering the portion of the device that must be opened in order to remove the strainer that is to be removed therefrom.

It is a particular purpose of my invention to provide a device of the above mentioned character, that comprises a combined selective control and shut-off valve, which controls the flow of liquid from an inlet passage to the strainer containing chambers or passages in the device, in such a manner that liquid is supplied to either one strainer chamber, or passage, or to the other strainer chamber, or passage, or to neither of these, thus shutting off the flow of liquid through the device, and to an apparatus supplied with liquid thereby, such as a liquid fuel burner.

It is a further purpose of my invention to provide in combination with such a valve, check valves, which are, preferably, ball check valves, that permit the flow of liquid from a strainer passage, or chamber, into an outlet chamber, but not from the outlet chamber into the strainer passage, or chamber, thus preventing flow of liquid from one strainer passage, or chamber, to the other passage, or chamber. These ball check valves serve the further function of preventing any back pressure due to any cause whatsoever, from entering either of the strainer passages, or chambers, from the outlet passage, or from any apparatus with which the outlet passage may be connected.

It is another important purpose of my invention to provide an arrangement of strainer receiving passages, or chambers, such that the strainers can be removed therefrom by a simple operation, and to so construct the strainers that the same can be readily removed from the passages in which the same are normally located, for cleaning or other purposes, and to replace the same in operative position. The V-shaped body portion of the device is provided to facilitate removal of the strainers.

It is another important purpose of my invention to provide a readily accessible mounting for the balls and springs of the ball check valves, and to so construct said ball check valves that the same will have a good seat that will provide a liquid-tight seating for the balls when the valves are in closed position.

It is another purpose of my invention to provide a device of the above mentioned character, in which the selective control and shut-off valve is so made that the same will remain in any adjusted position, and to provide means for operating the same to move the same to any of the selective positions thereof, comprising a handle member that is so detachably associated with the valve member that the handle member can be fitted on the valve member in only one position relative to said valve member, and so that the handle member can be utilized to indicate the direction of flow through the combined shut-off and selective control valve.

Said handle member preferably comprises a wrench that is provided with means for unscrewing plugs that provide for access to the strainer members and to the ball check valves.

Other objects and advantages of my invention will appear as the description of the drawing proceeds. I desire to have it understood, however, that I do not intend to limit myself to the particular details shown or described, except as defined in the claims.

In the drawing:

Fig. 1 is a front elevational view of my improved device, showing portions of the inlet and outlet passages connected therewith, and showing the handle member in two alternative positions.

Fig. 2 is an enlarged vertical sectional view through said selective control and strainer devices, taken substantially on the line 2—2 of Fig. 3.

Fig. 3 is a vertical sectional view taken at right angles to Fig. 2, being taken substantially on the line 3—3 of Fig. 2.

Fig. 4 is a fragmentary sectional view, taken on the line 4—4 of Fig. 3.

Fig. 5 is a section taken on the line 5—5 of Fig. 3.

Fig. 6 is a section taken on the line 6—6 of Fig. 3, and

Fig. 7 is a fragmentary sectional view through the selective control and shut-off valves, showing the same open to one of the strainer chambers.

Referring in detail to the drawing, my improved combination strainer and valve device comprises a body portion having a pair of obliquely extending tubular portions 10, which converge toward the outlet end 11 of the device. The tubular portions are joined by an upper transverse portion 12, which forms a valve casing for the valve member 13, which controls the flow of liquid from the inlet connection 14 into said device. The valve 13 is a combination selective control and shut-off valve. Said valve casing portion comprises an inlet passage 15 and outlet passages 16 and 17 that lead to the chambers 18 and 19 respectively, in the tubular portions 10. The tubular portions 10 are joined at their converging ends, both leading into a chamber 20 that leads to the outlet connection 11.

The valve 13 is provided with a tapering body portion that fits in a tapering bore 21, and is provided with a reduced end portion 22, around which the compression spring 23 extends, said spring seating against a shoulder 24 provided on the valve casing surrounding the valve 13 at one end thereof, and at the other end against a shouldered washer 25 that is slidably mounted on the stem portion 26 that projects from the other end of the valve. The stem portion 26 is threaded and receives a nut 27 thereon for adjusting the compression of the spring 23. It will be obvious that by adjusting the nut 27 the frictional engagement between the valve 13 and the tapering bore 21 can be varied as desired, the important feature being that the contact between the outer surface of the valve and the inner surface of the bore in the valve casing is sufficient that a tight connection is provided between the same, and that the valve will stay in its adjusted position.

The body portion of the valve is hollow, there being a chamber 28 within said valve, and thus a tubular passage is provided within said valve, a portion of the side wall of the valve being cut away at 29 to provide a passage in said valve for establishing communication between any of the ports 15, 16 and 17 that it may be desired to connect thereby. When the valve is in the position shown in Figs. 2 and 3, the solid wall portion thereof is in such position that the ports 15, 16 and 17 are all closed, thus shutting off the supply of liquid from the inner connection 14. This is the position of the valve shown in full lines in Fig. 1.

The valve member 13 is provided with a projection 30 on the larger end thereof that is shown as being triangular, but the sides of the triangular projection are all of different lengths so that the triangular opening 31 in the head 32 on the wrench-like handle 33 can only be engaged therewith in one relation to the valve, the offset 71 therein and the projection of the various parts of the device toward said handle also assuring this. Thus the position of the wrench-like handle 33 will indicate the seating of the valve. When the wrench-like handle is in the full line position shown in Fig. 1, the valve is in the "shut-off" position. When the wrench-like handle member is in the dotted position 33' shown in Fig. 1, and in Fig. 6, the valve is in such position that the opening 29 will overlap both the port 15 and the port 17, establishing communication with the chamber 19, while, when the handle member is in the dotted position 33" shown in Fig. 1, the opening 29 will be in such position that it overlaps the ports 15 and 16, establishing communication between the inlet connection 14 and the chamber 18. It will be obvious that in the position 33' of the handle mentioned, the closed wall portion of the valve 13 will completely cut off the passage 16 from communication with either the passage 17 or the passage 15, and that in the dotted line position 33" of the valve handle, the closed wall portion of the valve 13 will be in such position as to completely shut off the passage 17 from the passages 15 and 16.

The tubular member 10, which is provided with the chamber 18, into which the port 16 leads, is provided with an elongated tubular passage 34, and the tubular member 10, which has the chamber 19, into which the passage 17 leads, is provided with an elongated tubular passage 35, the chambers 18 and 19 being in communication, respectively, with the passages 34 and 35, and there being shoulders 36 provided between the passages 34 and 35 respectively, and the chambers 18 and 19. The passage 34 leads into the chamber 20 through a passage 37, there being a ball valve 38 provided for controlling flow of liquid through the passage 37 into the chamber 20. A similar passage 39 leads from the tubular passage 35 into the chamber 20, and a ball valve 40 controls the flow of liquid through the passage 39.

A partition is provided between each of the passages 34 and 35 and the chamber 20, these partitions each comprising an inwardly extending transverse wall portion 41, a longitudinally extending wall portion 42, and a transverse wall portion 43, the partitions thus forming valve chambers 44, in the end of the chamber 20 adjacent the passages 34 and 35, said valve chambers 44 accommodating the valve mechanism comprising the balls 38 and 40. The wall portions 42 are provided with valve seats 45 on the faces thereof, toward the chambers 44, against which the balls 38 and 44 seat. The valve seats 45 are made in the form of feather edged annular ribs on said wall portions 42.

A longitudinal web portion 46 separates the passages 34 and 35 at the ends thereof adjacent the chamber 20, and a similar web portion 47 is provided between the chambers 44, this being provided to strengthen the structure at this point, and to house the ball members 38 and 40. Tubular plug-like members 48 are provided that screw-threadedly engage in screw-threaded openings 49 in one wall of the chamber 20, said plug-like members 48 having flat faces 50 thereon for engagement of a wrench portion 51 therewith, the wrench portion being provided with an open side so that it can be utilized to unscrew the plug-like members 48, which are close together, as will be evident from Fig. 1, without one plug member 48 interfering with unscrewing of the other plug-like member. The plug-like members are provided with closed end walls, as will be obvious from Fig. 6, against which the compression coil springs 52 bear, said springs engaging the balls 38 and 40 to hold the same against the seats 45. It will be obvious that the ball valves 38 and 40 are check valves that prevent flow of liquid from the chamber 20 into either the passage 34 or 35, but which do not prevent the flow of liquid from either the passage 34 or 35 into the chamber 20.

Each of the tubular portions 10 is provided with screw-threaded openings 53 therein at the diverging ends thereof, with which screw plugs engage to close the chambers 18 and 19 under normal conditions, the screw plug 54 being provided for closing the chamber 18, and the screw plug 55 being provided for closing the chamber 19. These screw plugs are of the same construction, being provided with flanges 56 that engage annular shoulders 57 on the diverging ends of the tubular portions 10, and with inwardly extending externally threaded tubular portions 58 that engage with the internal threads 53, thus providing socket portions having end walls 59 therein. The plugs 54 and 55 are so made that the same, when threaded into position, provide a liquid-tight closure for the chambers 18 and 19.

Mounted in the passage 34 is a substantially cylindrical strainer member 60, and mounted in the tubular passage 35 is a similar substantially cylindrical strainer member 61, said strainer members 60 and 61 having the end walls 62, which are perforated, as well as are the side walls of the strainers. The openings provided in the perforated walls of the strainer members can be made of any desired size for the purpose intended, being, preferably, made rather small so as to strain out any particles that might interfere with the proper flow of liquid into an oil burner, or similar device, that may have a needle valve used to control the same, or that may have small passages for the discharge of liquid therefrom.

Each of the strainer members is provided with a flange 63 at the open end thereof that engages with the shoulder 36 when the strainer member is in position. The end wall 62 has a rod-like member 64 secured thereto, which extends beyond the open end of the strainer and is provided with a loop portion 65 that serves as a handle member, said loop portion being in substantial engagement with the end wall 59 of the socket portion on the inside of the plug 54 or 55, as the case may be, so as to prevent any shifting of the strainer member in the passage in which the same is located.

By this arrangement the strainer members are held in proper position in the device, with the flange 63 against the shoulder 36, thus preventing any particles from going past the strainer without passing through the same, and also providing means for not only holding the strainer in the desired position, but for manipulating the same into and out of position within the device, without difficulty. The handle portions 65 are relatively clean, even where a heavy oil is used in connection with the apparatus, and there are no loose rings or gaskets, or other parts, that become gummed up that have to be removed when it is desired to remove a strainer for cleaning purposes, or for other purposes. The strainer can be removed as a unit by means of the handle portions 65, all that is necessary to remove and replace a strainer being to remove the plug and the strainer, and then replace these parts after cleaning or otherwise performing any desired operations on the strainer. The plug members 54 and 55 are provided with a hexagonal portion 66 thereon, with which the hexagonal wrench portion 67 engages for unscrewing these plugs and for screwing them back into position.

It will be obvious that when the strainer member 60 is to be removed, for example, all that is necessary is to set the valve in the position shown in Fig. 7, which is that with the handle in the dotted line position 33' shown in Fig. 1, at which time the closed wall portion of the valve 13 will close off the passage or port 16, establishing communication between the ports 15 and 17, and causing the liquid to pass through the strainer 61 past the ball valve 40, into the outlet chamber 20, the ball valve 38 preventing any liquid from passing backwardly into the passage 34. The plug 54 and the strainer 60 can then be removed without any danger of any oil, or other liquid, flowing out through the plug receiving opening 53. After the strainer 60 has been cleaned, it can be replaced in position and the plug 54 screwed down in liquid-tight relation with the opening in the tubular portion 10 with which it is associated. Then the valve can be turned so that the handle has the position 33" indicated in Fig. 1, when the port 17 will be closed and the ports 15 and 16 will be in communication, whereupon the ball valve 38 will be open to permit liquid to pass therethrough, the ball valve 40 will shut off communication between the chamber 20 and the passage 35, and the strainer 61 can be removed by removing the plug 55 in a similar manner to that previously described in connection with the strainer 60. The operation of a single simply constructed valve is all that is necessary to accomplish this removal and replacement of the strainer members, the ball valves 38 and 40 cooperating therewith to prevent any flow of liquid in the wrong direction, and also preventing any back pressure communicated through the outlet pipe 68 from reaching the passages 34 or 35. The inlet pipe 69 is also shown as being connected with the inlet 14.

It will be noted that the rod-like handle member 64 with the loop 65 thereon, does not in any respect interfere with the passage of the liquid through the strainer member, leaving a clear passage all around the same for the liquid to pass through the openings in the strainer. It will also be noted that due to the V-shaped character of the body portion of the device and the arrangement of the inlet passage 14 relative to the inclined portions 10 having the passages 34 and 35, the plugs 54 and 55 and the strainers 60 and 61 can be readily removed and replaced without any interference of the pipe 69 with such operation.

What I claim is:

1. In a device of the character described, a body portion having an inlet at one end thereof, and an outlet at the other end thereof, a pair of longitudinal strainer chambers in said body portion, strainers removably mounted therein, a combination selective control and shut-off valve for directing flow of fluid to either of said chambers or shutting off flow of fluid to both thereof, a screw plug in each chamber providing access to said strainers to remove or replace the same, an outlet from each of said chambers leading to the outlet of said body portion and a check valve at each of said outlets, said combination valve having an unsymmetrical end portion thereon and having a detachable elongated wrench-like handle thereon so formed as to engage said end portion of said valve in only one relation, whereby the position thereof indicates the setting of said valve, said handle extending substantially parallel to said body portion and being provided with means adapted to engage said plugs to turn the same.

2. A device of the character described, comprising a tapering body portion having a pair of tubular portions converging toward one end of said device, an outlet connection extending endwise from said body portion at the converging ends of said tubular portions, ball check valves between said tubular portions and said outlet connection, tubular strainers in said tubular portions, the divergent ends of said tubular portions having openings therein through which said strainers are adapted to be passed, screw plugs closing said openings, a connecting portion extending between the divergent ends of said tubular portions, and an inlet connection extending endwise from said connecting portion between said screw plugs.

3. A device of the character described, comprising a body portion having a pair of tubular portions converging toward one end of said device, strainer members in said tubular portion, an outlet connection extending endwise from said body portion at the converging ends of said tubular portions, a partition at the converging end of each tubular portion having a raised annular valve seat thereon, ball check valves engaging said seats, and screw-threaded means providing access to said ball check valves.

4. A device of the character described, comprising a body portion having a pair of tubular portions converging toward one end of said device, strainer members in said tubular portions, a longitudinal partition in said body portion at the converging end of each tubular portion and transverse walls extending from each partition to the opposite walls of the tubular portion having said partition, a projecting annular valve seat rib on one face of each partition surrounding an opening therein, a ball check valve engaging each seat, a spring urging each check valve toward its seat, tubular plugs screw-threadedly engaging said body portion and receiving said springs and an outlet connection to which said valves lead extending endwise from said body portion at the converging ends of said tubular portions.

HARRY C. EASTER.